US012348627B2

(12) United States Patent
Aigner

(10) Patent No.: US 12,348,627 B2
(45) Date of Patent: Jul. 1, 2025

(54) EXECUTING ATTESTATION CLIENT CODE BY EXECUTING A DYNAMIC ROOT OF TRUST FOR MEASUREMENT (DRTM) SEQUENCE TO ATTEST HEALTH OF A COMPUTING DEVICE

(71) Applicant: Microsoft Technology Licensing, LLC, Redmond, WA (US)

(72) Inventor: Ronald Aigner, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 426 days.

(21) Appl. No.: 17/829,292

(22) Filed: May 31, 2022

(65) Prior Publication Data

US 2023/0388110 A1 Nov. 30, 2023

(51) Int. Cl.
*H04L 9/08* (2006.01)
*H04L 9/14* (2006.01)
*H04L 9/32* (2006.01)

(52) U.S. Cl.
CPC .......... *H04L 9/0877* (2013.01); *H04L 9/0838* (2013.01); *H04L 9/14* (2013.01); *H04L 9/3234* (2013.01)

(58) Field of Classification Search
CPC ....... H04L 9/0877; H04L 9/0838; H04L 9/14; H04L 9/3234; H04L 9/3263; G06F 21/64;
(Continued)

(56) References Cited

U.S. PATENT DOCUMENTS 8,966,642 B2   2/2015 Quinn et al.
9,177,153 B1 * 11/2015 Perrig ................ G06F 21/57
(Continued)

FOREIGN PATENT DOCUMENTS

EP       2904538 A1   8/2015
WO    2022046074 A1   3/2022

OTHER PUBLICATIONS

Daniel, et al., "Towards a Trust Envisioned Cyber Security", In International Journal of Innovation and Applied Studies, vol. 2, Issue 4, Apr. 2013, pp. 540-546.
(Continued)

*Primary Examiner* — Bryan F Wright
(74) *Attorney, Agent, or Firm* — Wade IP Law PLLC

(57) ABSTRACT

Techniques are described herein that use attestation client code to attest health of a computing device. The computing device receives the attestation client code and a cryptographic key from an attestation service. The cryptographic key is associated with a TPM of the computing device and is usable only by the attestation client code. The computing device executes the attestation client code by executing a dynamic root of trust for measurement (DRTM) sequence. The computing device causes the attestation client code to gather measurements that indicate attributes of an operating system of the computing device. The computing device causes the attestation client code to generate protected measurements by using the cryptographic key to sign and/or encrypt the measurements. The computing device causes the attestation service to establish trust in the measurements by causing the protected measurements to be provided to the attestation service.

20 Claims, 7 Drawing Sheets

(58) Field of Classification Search
CPC ... G06F 2221/2151; G06F 21/53; G06F 21/57
USPC ......................................................... 713/168
See application file for complete search history.

(56) References Cited

U.S. PATENT DOCUMENTS

| | | | |
|---|---|---|---|
| 9,977,888 B2 | 5/2018 | Sarangdhar et al. | |
| 10,148,442 B2 | 12/2018 | Hawblitzel et al. | |
| 10,229,270 B2* | 3/2019 | Campagna | H04L 63/067 |
| 10,635,821 B2 | 4/2020 | Cheng et al. | |
| 10,803,175 B2* | 10/2020 | Vasudevan | H04L 9/3234 |
| 2010/0031047 A1* | 2/2010 | Coker | H04L 63/0281 |
| | | | 713/176 |
| 2017/0300309 A1* | 10/2017 | Berger | G06F 8/61 |
| 2018/0109561 A1* | 4/2018 | Kegel | H04L 9/3234 |
| 2019/0363894 A1* | 11/2019 | Kumar Ujjwal | H04L 9/3268 |
| 2020/0396217 A1 | 12/2020 | Sinha et al. | |

OTHER PUBLICATIONS

Hovsmith, Skip, "First Experiences with React Native: Bridging an IOS Native Module for App Authentication", Retrieved From: https://medium.com/hackernoon/first-experiences-with-react-native-bridging-an-ios-native-module-for-app-authentication-7a20b7180fc9, May 10, 2018, 18 Pages.

Simpson, et al., "Windows Defender System Guard: How a Hardware-based Root of Trust Helps Protect Windows 10", Retrieved From: https://docs.microsoft.com/en-us/windows/security/threat-protection/windows-defender-system-guard/how-hardware-based-root-of-trust-helps-protect-windows, Feb. 24, 2022, 4 Pages.

Ooms, Rudy, "Device Health Attestation: Age of Compliance", Retrieved from: https://web.archive.org/web/20220522142231/https://call4cloud.nl/2021/10/device-health-attestation-age-of-compliance/, Oct. 5, 2021, 28 Pages.

"International Search Report and Written Opinion Issued in PCT Application No. PCT/US23/018264", Mailed Date: Jul. 10, 2023, 12 Pages.

* cited by examiner

EXECUTING ATTESTATION CLIENT CODE BY EXECUTING A DYNAMIC ROOT OF TRUST FOR MEASUREMENT (DRTM) SEQUENCE TO ATTEST HEALTH OF A COMPUTING DEVICE

BACKGROUND

Attestation is a process of validating integrity of a computing device (e.g., hardware and/or software therein). For instance, when a computing device attempts to access a resource (e.g., a corporate document or a service), the resource may require proof that the computing device is not running malicious software in order to grant the computing device access to the resource. Such proof typically is provided in the form of a device health certificate that is issued by an attestation service. The attestation service typically queries the computing device for information about a state of the computing device and checks that information for indications of malicious software. If no indications of malicious software are found, the attestation service may issue the device health certification. Conventional attestation techniques leave the attestation service susceptible to attacks because the attestation service traditionally must trust software that is running on the computing device to be honest and to provide accurate information about the state of the computing device to the attestation service.

SUMMARY

Various approaches are described herein for, among other things, using attestation client code to attest health of a computing device. Examples of a computing device include a user device, an Internet of things (IoT) device, and an unmanned device (e.g., an autonomous vehicle). Attestation client code is code that is received at a computing device from an attestation service and that is configured to gather measurements that represent a state of the computing device. The gathered measurements need not necessarily represent an entire state of the computing device. For instance, the gathered measurements may represent a portion of the entire state. In an example, by using the attestation client code, which is received from the attestation service, to gather the measurements, the computing device enables the attestation service to trust that the gathered measurements accurately represent the state of the computing device. An attestation service is a service that performs operations to validate integrity of a computing device. The attestation client code is configured to sign and/or encrypt the gathered measurements with a cryptographic key that is associated with a trusted platform module (TPM) of the computing device. In an example, by using the cryptographic key to sign and/or encrypt the gathered measurements, the computing device enables the attestation service to trust that the gathered measurements have not been modified by another entity.

A TPM is a microcontroller designed to assure integrity (e.g., expected behavior) of a device by integrating cryptographic keys and unforgeable measurements into the device. Such cryptographic keys may be used to establish a "chain of trust" under which each component of hardware and software of the device may be validated (e.g., certified). In an example embodiment, the TPM is configured to operate in accordance with the TPM technical specification written by a computer industry consortium called Trusted Computing Group (TCG). In another example embodiment, the TPM is implemented as a semiconductor chip that has a randomly-created, static endorsement key associated with the chip. The endorsement key has a public portion (a.k.a. public key) and a private portion (a.k.a. private key). The private portion does not leave the chip, whereas the public portion is publicly available for attestation and other purposes.

In an example approach, attestation client code and a cryptographic key are received from an attestation service. The cryptographic key is associated with a TPM of a computing device and is usable only by the attestation client code. For example, the cryptographic key may be associated with a policy that requires the attestation client code to be executing in order for the cryptographic key to be used. The attestation client code is executed by executing a dynamic root of trust for measurement (DRTM) sequence. For instance, execution of the DRTM sequence may initiate (e.g., trigger) execution of the attestation client code. A DRTM sequence is a sequence that allows a state of a computing device to be reset into a trusted state at an arbitrary time during a runtime of the computing device. For instance, the DRTM may reset dynamic platform configuration registers (PCRs), such as PCRs 17-22, in the TPM to respective default values. The attestation client code is caused to gather measurements that indicate attributes of an operating system of the computing device. The attestation client code is caused to generate protected measurements by using the cryptographic key to sign and/or encrypt the gathered measurements. The attestation service is caused to establish trust in the gathered measurements by causing the protected measurements to be provided to the attestation service. For instance, the attestation service may be caused to compare the gathered measurements to reference measurements associated with the TPM to determine whether the gathered measurements and the reference measurements are same.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
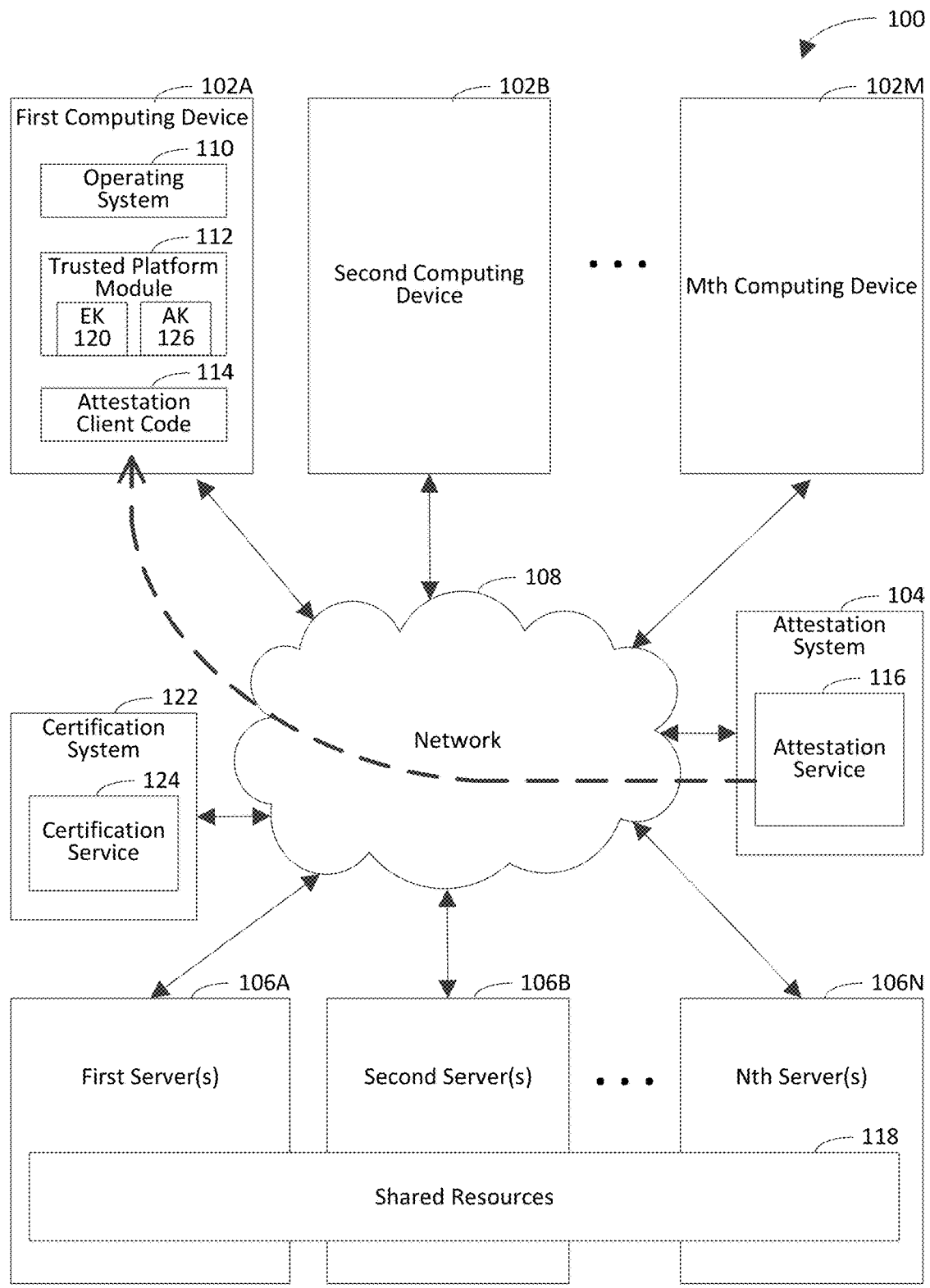
FIG. 1 is a block diagram of an example client code-based attestation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

As explained above, when a computing device attempts to access a resource (e.g., a corporate document or a service), the resource may require proof that the computing device is not running malicious software in order to grant the computing device access to the resource. Such proof typically is provided in the form of a device health certificate that is issued by an attestation service. However, conventional attestation techniques leave the attestation service susceptible to attacks because the attestation service traditionally must trust software that is running on the computing device to be honest and to provide accurate information about the state of the computing device to the attestation service.

Example embodiments described herein use attestation client code to attest health of a computing device. Examples of a computing device include a user device, an Internet of things (IoT) device, and an unmanned device (e.g., an autonomous vehicle). Attestation client code is code that is received at a computing device from an attestation service and that is configured to gather measurements that represent a state of the computing device. The gathered measurements need not necessarily represent an entire state of the computing device. For instance, the gathered measurements may represent a portion of the entire state. In an example, by using the attestation client code, which is received from the attestation service, to gather the measurements, the computing device enables the attestation service to trust that the gathered measurements accurately represent the state of the computing device. An attestation service is a service that performs operations to validate integrity of a computing device. The attestation client code is configured to sign and/or encrypt the gathered measurements with a cryptographic key that is associated with a trusted platform module (TPM) of the computing device. In an example, by using the cryptographic key to sign and/or encrypt the gathered measurements, the computing device enables the attestation service to trust that the gathered measurements have not been modified by another entity.

A TPM is a microcontroller designed to assure integrity (e.g., expected behavior) of a device by integrating cryptographic keys and unforgeable measurements into the device. Such cryptographic keys may be used to establish a "chain of trust" under which each component of hardware and software of the device may be validated (e.g., certified). In an example embodiment, the TPM is configured to operate in accordance with the TPM technical specification written by a computer industry consortium called Trusted Computing Group (TCG). In another example embodiment, the TPM is implemented as a semiconductor chip that has a randomly-created, static endorsement key associated with the chip. The endorsement key has a public portion (a.k.a. public key) and a private portion (a.k.a. private key). The private portion does not leave the chip, whereas the public portion is publicly available for attestation and other purposes.

Example techniques described herein have a variety of benefits as compared to conventional attestation techniques. For instance, the example techniques increase security of a computing system on which a shared resource is located. In some embodiments, using attestation client code that is received from an attestation service at a computing device to gather measurements of the computing device for purposes of attestation reduces a likelihood that malicious code on the computing device will gain access to the shared resource. The attestation client code being in control of gathering the measurements prevents the malicious code from modifying the measurements to exclude an indication of the malicious code. By executing a DRTM sequence to trigger execution of the attestation client code on the computing device, the DRTM sequence can ensure that no other code executes while the attestation client code executes. Not allowing other code to execute while the attestation client code executes prevents the other code from manipulating the attestation client code while the attestation client code is executing. A DRTM sequence is a sequence that allows a state of a computing device to be reset into a trusted state at an arbitrary time during a runtime of the computing device. For instance, the DRTM may reset dynamic platform configuration registers (PCRs), such as PCRs 17-22, in the TPM to respective default values.

The example techniques may reduce an amount of time and/or resources (e.g., processor cycles, memory, network bandwidth) that is consumed to address malicious attacks against an attestation service. For instance, by preventing malicious code on a computing device from being granted access to a shared resource, a computing system that is used to manage security of the shared resource need not perform operations to remediate damage that would have resulted from the access being granted to the malicious code. By reducing the amount of time and/or resources that are consumed, the example techniques increase efficiency of a computing system that is used to address malicious attacks against the attestation service. By reducing a likelihood that malicious code on the computing device will gain access to the shared resource, the example techniques may improve (e.g., increase) a user experience of a user of the computing system that is used to manage security of the shared resource and/or increase efficiency of the user.

The example techniques may be more thorough, reliable, and/or efficient than conventional attestation techniques. For instance, the example techniques may be more thorough and/or reliable by ensuring that malicious code on the computing device is unable to trick the attestation service into granting the malicious code access to a shared resource. The example techniques may be more efficient by eliminating a need to perform operations to remediate damage from the malicious code gaining access to the shared resource.

FIG. 1 is a block diagram of an example client code-based attestation system 100 in accordance with an embodiment. Generally speaking, the client code-based attestation system 100 operates to provide information to users in response to requests (e.g., hypertext transfer protocol (HTTP) requests) that are received from the users. In various embodiments, the information includes documents (e.g., Web pages, images, audio files, and video files), output of executables, and/or any other suitable type of information. In accordance with example embodiments described herein, the client code-based attestation system 100 using attestation client code 114 to attest health of a computing device (e.g., any of computing devices 102A-102M). Detail regarding techniques for using attestation client code to attest health of a computing device is provided in the following discussion.

As shown in FIG. 1, the client code-based attestation system 100 includes a plurality of computing devices 102A-102M, an attestation system 104, a plurality of servers 106A-106N, a network 108, and a certification system 122. Communication among the computing devices 102A-102M, the attestation system 104, the servers 106A-106N, and the certification system 122 is carried out over the network 108 using well-known network communication protocols. In embodiments, the network 108 is a wide-area network (e.g., the Internet), a local area network (LAN), another type of network, or a combination thereof.

The computing devices 102A-102M are computing systems that are capable of communicating with servers 106A-106N. A computing system is a system that includes a processing system comprising at least one processor that is capable of manipulating data in accordance with a set of instructions. For instance, a computing system may be a computer or a personal digital assistant. The computing devices 102A-102M are configured to provide requests to the servers 106A-106N for information stored on (or otherwise accessible via) the servers 106A-106N. For example, the computing devices 102A-102M may provide requests to access shared resources 118 that are stored on the servers 106A-106N. A shared resource is a resource that is made available to multiple computing devices. Examples of a resource include a device (e.g., a storage device or a printer) and information (e.g., a computer program or data). The shared resource may be remotely accessed by any of the computing devices transparently as if the shared resource were a resource in the respective computing device. The requests to access the shared resources 118 may be configured in accordance with a Server Message Block™ (SMB) communication protocol, which was developed by Microsoft Corporation. The SMB communication protocol enables computing devices to receive shared access to resources via a network. Accordingly, configuring the requests to access the shared resources 118 in accordance with the SMB protocol enables the computing devices 102A-102M to receive shared access to the shared resources 118 via the network 108. In example embodiment, when any of the computing devices 102A-102M provides a request to access a shared resource, the computing device also may provide a verification (e.g., a device health certificate) from the attestation system 104, which verifies that the computing device is trustworthy. Techniques for establishing trust in a computing device are discussed in further detail below.

In embodiments, a user initiates a request for executing a computer program (e.g., an application) using a client (e.g., a Web browser, Web crawler, or other type of client) deployed on a computing device 102 that is owned by or otherwise accessible to the user. In accordance with some example embodiments, the computing devices 102A-102M are capable of accessing domains (e.g., Web sites) hosted by the servers 106A-106N, so that the computing devices 102A-102M may access information that is available via the domains. Such domain may include Web pages, which may be provided as hypertext markup language (HTML) documents and objects (e.g., files) that are linked therein, for example.

The first computing device 102A is shown to include an operating system 110, a trusted platform module (TPM) 112, and attestation client code 114 for illustrative purposes. The operating system 110 performs operations which may include managing computer hardware and software resources and providing services for computer programs on the first computing device 102A. In accordance with example embodiments described herein, the operating system 110 receives the attestation client code 114 from the attestation server 104 and installs the attestation client code 114 on the first computing device 102A. For instance, the operating system 104 may copy files that are required to run the attestation client code 114 to a local disk on the first computing device 102A and create any new directories that are required to run the attestation client code 114. When the attestation client code 114 gathers measurement that represent a state of the first computing device 102A, as described below, the operating system 110 causes the attestation system 104 to determine trustworthiness of the gathered measurements by causing the gathered measurements to be provided to the attestation service 110. For instance, the operating system 110 may provide the gathered measurements to the attestation system 104, or the operating system 110 may instruct the attestation client code 114 to do so. If the gathered measurements are deemed to be trustworthy by the attestation system 104, the operating system 110 receives a verification from the attestation system 104. When the operating system 110 provides a request to access a shared resource of the shared resources 118, the operating system 110 may also provide the verification as evidence that the first computing device 102A can be trusted to access the shared resource. Examples of an operating system include Berkeley Software Distribution™ (BSD), developed and distributed by the Computer Systems Research Group (CSRG) of the University of California, Berkeley, or descendants thereof; Linux developed and distributed under the GNU Project; iOS™ developed and distributed by Apple Inc.; Microsoft Windows® developed and distributed by Microsoft Corporation; and UNIX™ developed and distributed by AT&T.

The TPM 112 is a physical hardware component that assures integrity of the first computing device 102A. The TPM 112 includes an endorsement key (EK) 120 and an attestation key (AK) 126. The endorsement key 120 and the attestation key 126 may help vouch for a state (or portion thereof) of the operating system 110. Each of the endorsement key 120 and the attestation key is an asymmetric cryptographic key, meaning that each of the endorsement key 120 and the attestation key 126 includes a private portion and a public portion. The private portion remains private within the TPM 112 (i.e., is not shared outside the TPM 112). The public portion is shared outside the TPM 112 for purposes of establishing a chain of trust with regard to hardware and software components of the first computing device 102A. It should be noted that the endorsement key 120 is included in an endorsement key certificate that is issued to the TPM 112 by a manufacturer of the TPM 112. The endorsement key certificate vouches for the endorsement key 120.

In an example embodiment, the TPM 112 is a virtual TPM (vTPM), rather than a physical hardware component. A vTPM is a software emulation of a TPM. The vTPM may be provided by a hypervisor, for example.

The attestation client code 114 gathers measurements that indicate attributes of the operating system 110. In a first attestation embodiment, the attestation client code 114 uses the endorsement key 120 to sign and/or encrypt the gathered measurements. For instance, the attestation client code 114 may query the TPM 112 to obtain the endorsement key certificate, which includes the endorsement key 120. In a first aspect of this embodiment, the attestation client code 114 encrypts the gathered measurements with the public portion of the endorsement key 120. In a second aspect of this embodiment, the attestation client code 114 signs the gathered measurements with the private portion of the endorsement key 120. The attestation client code 114 provides the gathered measurements, which are signed and/or encrypted using the endorsement key 120, to the attestation system 104, or the attestation client code 114 provides the gathered measurements to the operating system 110 for forwarding to the attestation system 104.

In a second attestation embodiment, the attestation client code 114 uses the attestation key 126 to sign and/or encrypt the gathered measurements. In accordance with this embodiment, the attestation client code 114 provides the endorsement key certificate, which includes the endorsement key 120, and the attestation key 126 to the certification system 122 to enable the certification system 122 to issue an attestation key certificate for the attestation key 126. The attestation client code 114 receives the attestation key certificate, which verifies the first computing device 102A as the owner of the attestation key 126, from the certification system 122 based on the endorsement key 120 being associated with the first computing device 102A and further based on the endorsement key certificate vouching for the endorsement key 120. The attestation key certificate is configured to be accessed only on a device that includes the TPM 112 to which the endorsement key 120 belongs. Accordingly, the attestation key certificate is accessible only on the first computing device 102A.

In an example embodiment, the attestation client code 114 is implemented in software.

Each of the computing devices 102A-102M may include any client-enabled system or device, including a desktop computer, a laptop computer, a tablet computer, a wearable computer such as a smart watch or a head-mounted computer, a personal digital assistant, a cellular telephone, an Internet of things (IoT) device, an unmanned device such as an autonomous vehicle, or the like. It will be recognized that any one or more of the computing devices 102A-102M may communicate with any one or more of the servers 106A-106N.

The certification system 122 is a computing system that is configured to store, sign, and issue digital certificates for cryptographic keys. The certification system 122 hosts a certification service 124 that identifies ownership of the cryptographic keys and issues the certificates to verify the ownership. In accordance with the second attestation embodiment mentioned above, the certification service 124 receives the endorsement key certificate, which includes the endorsement key 120, and the attestation key 120 from the attestation client code 114. By analyzing the endorsement key certificate, the certification service 124 determines that the endorsement key 120 is associated with the first computing device 102A and that the endorsement key certificate vouches for the endorsement key 120. Based on this determination, the certification service 124 identifies the first computing device 120 as the owner of the attestation key 126. The certification service 124 issues the attestation key certificate, which verifies that the first computing device 102A is the owner of the attestation key 126, as a result of identifying the first computing device 120 as the owner. Because the attestation key certificate verifies that the first computing device 102A is the owner of the attestation key 126, the attestation key 126 is accessible only on the first computing device 102A.

The attestation system 104 is a computing system that is configured to determine validity of measurements that are received from the computing devices 102A-102M. The attestation system 104 hosts an attestation service 116 that analyzes the received measurements to determine whether the received measurements are trustworthy based on (e.g., based at least in part on) whether the received measurements satisfy one or more criteria. In a first example, the attestation service 116 compares the received measurements to reference measurements that are known to be valid to determine whether the received measurements and the reference measurements are the same. In accordance with this example, if the received measurements and the reference measurements are the same, a first criterion is deemed to be satisfied; otherwise, the first criterion is deemed not to be satisfied. In a second example, the attestation service 116 determines whether the received measurements are signed using the endorsement key 120. In accordance with this example, if the received measurements are signed using the endorsement key 120, a second criterion is deemed to be satisfied; otherwise, the second criterion is deemed not to be satisfied. In a third example, the attestation service 116 determines whether the received measurements are signed using the attestation key 126. In accordance with this example, if the received measurements are signed using the attestation key 126, a third criterion is deemed to be satisfied; otherwise, the third criterion is deemed not to be satisfied. In a fourth example, the attestation client code 114 determines whether the received measurements are encrypted using the endorsement key 120. In accordance with this example, if the received measurements are encrypted using the endorsement key 120, a fourth criterion is deemed to be satisfied; otherwise, the fourth criterion is deemed not to be satisfied. In a fifth example, the attestation client code 114 determines whether the received measurements are encrypted using the attestation key 126. In accordance with this example, if the received measurements are encrypted using the attestation key 126, a fourth criterion is deemed to be satisfied; otherwise, the fourth criterion is deemed not to be satisfied.

If the one or more criteria are satisfied, the received measurements are deemed to be trustworthy; otherwise, the received measurements are deemed to be untrustworthy. The attestation service 116 is configured to provides a verification to the computing device from which the measurements are received, indicating that the computing device is trustworthy, based on the one or more criteria being satisfied. The attestation service 116 is further configured not to provide the verification to the computing device from which the measurements are received based on at least one of the one or more criteria not being satisfied.

The servers 106A-106N are computing systems that are capable of communicating with the computing devices 102A-102M. The servers 106A-106N are configured to execute computer programs that provide information to users in response to receiving requests from the users. For example, the information may include documents (e.g., Web pages, images, audio files, and video files), output of executables, or any other suitable type of information. In accordance with some example embodiments, the servers 106A-106N are configured to host respective Web sites, so that the Web sites are accessible to users of the client code-based attestation system 100.

The servers 106A-106N include the shared resources 118. For instance, the shared resources 118 may be distributed among the servers 106A-106N, though it will be recognized that any of the shared resources 118 may be included in a single server. The servers 106A-106N are configured to conditionally provide access to the shared resources 118 based on the state of the computing devices that request access to the shared resources 118 being validated by the attestation system 104. In an example embodiment, if a computing device that requests access to a shared resource does not provide a verification issued by the attestation service 116, indicating that the computing device is trustworthy, a server that includes the shared resource denies the computing device access to the shared resource. In another example embodiment, if a computing device that requests access to a shared resource provides a verification issued by the attestation service 116, indicating that the computing device is trustworthy, a server that includes the shared resource grants the computing device access to the shared resource.

In various embodiments, the operating system 110 and/or the TPM 112 may be implemented in various ways for attesting health of a computing device, including being implemented in hardware, software, firmware, or any combination thereof. For example, the operating system 110 and/or the TPM 112 may be implemented as computer program code configured to be executed in a processing system (e.g., one or more processors). In another example, at least a portion of the operating system 110 and/or the TPM 112 is implemented as hardware logic/electrical circuitry. For instance, at least a portion of the operating system 110 and/or the TPM 112 may be implemented in a field-programmable gate array (FPGA), an application-specific integrated circuit (ASIC), an application-specific standard product (ASSP), a system-on-a-chip system (SoC), or a complex programmable logic device (CPLD). Each SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

It will be recognized that each of the computing devices 102A-102M may include an operating system, a TPM, and attestation client code that are configured to operate as described above with regard to the operating system 110, the TPM 112, and the attestation client code 114 in the first computing device 102A.

FIGS. 2-5 depict flowcharts 200, 300, 400, and 500 of example methods for using attestation client code to attest health of a computing device in accordance with embodiments. Flowcharts 200, 300, 400, and 500 may be performed by the first computing device 102A, shown in FIG. 1, for example. For illustrative purposes, flowcharts 200, 300, 400, and 500 are described with respect to computing system 600 shown in FIG. 6, which is an example implementation of the first computing device 102A. As shown in FIG. 6, the computing system 600 includes an operating system 610, a trusted platform module (TPM) 612, and attestation client code 614. The operating system 610 includes execution logic 620, trust logic 622, and key logic 624. The attestation client code 614 includes measurement logic 626, protection logic 628, and determination logic 630. Further structural and operational embodiments will be apparent to persons skilled in the relevant art(s) based on the discussion regarding flowcharts 200, 300, 400, and 500.

Figure 2:
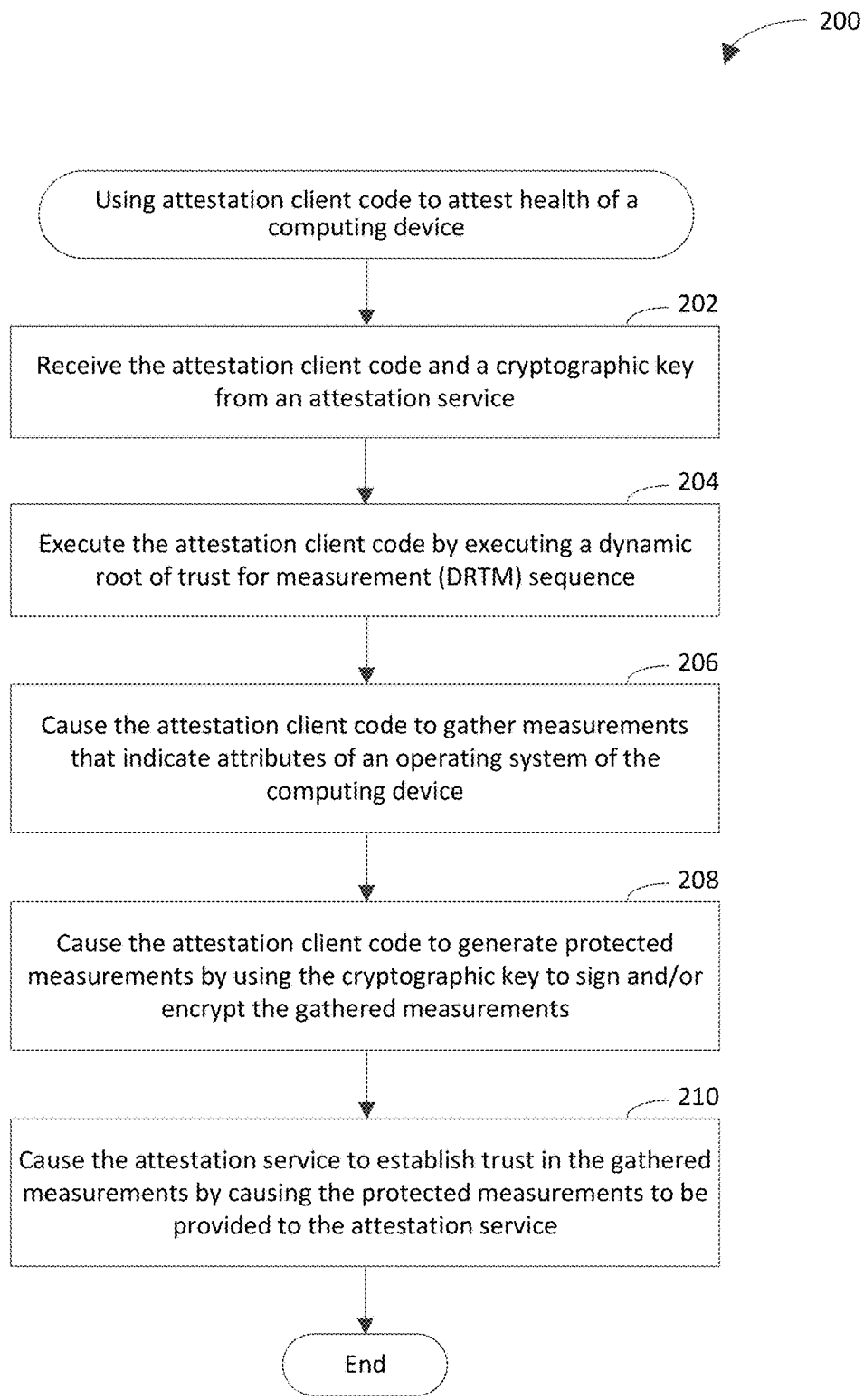
FIGS. 2-5 depict flowcharts of example methods for using attestation client code to attest health of a computing device in accordance with embodiments.

As shown in FIG. 2, the method of flowchart 200 begins at step 202. In step 202, the attestation client code and a cryptographic key are received from an attestation service (e.g., by an operating system that executes on the computing device). The cryptographic key is associated with a trusted platform module (TPM) of the computing device. The cryptographic key is usable only by the attestation client code. Accordingly, the cryptographic key may be bound to the computing device. In an example embodiment, the cryptographic key is usable only while the attestation client code is being executed by the computing device. In an example implementation, the execution logic 620 receives attestation client code 614 and a first cryptographic key 632 from the attestation service. The first cryptographic key 632 is associated with the TPM 612 and is usable only by the attestation client code 614.

At step 204, the attestation client code is executed by executing a dynamic root of trust for measurement (DRTM) sequence. Execution of the DRTM sequence triggers execution of the attestation client code. In an example implementation, the execution logic 620 executes the DRTM sequence, which triggers execution of the attestation client code 614.

In an example embodiment, executing the DRTM sequence at step 204 causes the attestation client code to run as a trustlet. A trustlet is a computer program that runs as an isolated user mode (IUM) process in virtual secure mode (VSM). IUM is the runtime environment that hosts security applications inside VSM on a Hyper-V host. VSM leverages the Hyper-V hypervisor and second level address translation (SLAT) to create a set of modes called virtual trust levels (VTLs). The VSM configures the VTLs to provide a security boundary that prevents processes running in one VTL from accessing the memory of another VTL.

In another example embodiment, executing the DRTM sequence at step 204 creates a trusted execution environment (TEE) in which the attestation client code runs. A TEE is a secure area associated with a platform in a computing system. For instance, the platform may be the operating system of the computing system. The TEE enables isolated, safe execution of the attestation client code. The TEE also may serve as an isolated, trusted environment in which sensitive data is stored, processed, and protected. Accordingly, the TEE may provide end-to-end security by enforcing protected execution of the attestation client code, confidentiality, authenticity, privacy, system integrity, and data access rights.

In yet another example embodiment, executing the DRTM sequence at step 204 includes using the DRTM sequence to restrict execution of code on the operating system such that no code other than the attestation client code executes on the operating system while the attestation client code executes.

At step 206, the attestation client code is caused to gather measurements that indicate attributes of an operating system of the computing device. In an example embodiment, the measurements indicate computer programs that are stored on the computing device. In accordance with this embodiment, the attributes of the operating system include the computer programs that are stored on the computing device. It will be recognized that the computer programs that are stored on the computing device include the attestation client code, which was received from the attestation service. In an example implementation, the execution logic 620 causes the attestation client code 614 to gather measurements 644 that indicate attributes of the operating system 610 by providing an instruction to the attestation client code 614. In accordance with this implementation, the measurement logic 626 gathers measurements 644 that indicate attributes of the operating system 610 based on receipt of the instruction from the execution logic 620.

At step 208, the attestation client code is caused to generate protected measurements by using the cryptographic key to sign and/or encrypt the gathered measurements. In an example embodiment, the attestation client code returns control to the operating system based on the protected measurements being generated. In an example implementation, the execution logic 620 causes the attestation logic 614 to generate protected measurements 638 by providing an instruction to the attestation client code 614. In accordance with this implementation, the protection logic 628 generates the protected measurements 638 by using the first cryptographic key 632 to sign and/or encrypt the measurements 644 based on receipt of the instruction from the execution logic 620. For instance, the protection logic 628 may retrieve the first cryptographic key 632 from the execution logic 620 for purposes of signing and/or encrypting the measurements 644.

At step 210, the attestation service is caused (e.g., triggered) to establish trust in the gathered measurements by causing the protected measurements to be provided to the attestation service. In an example embodiment, the operating system causes the attestation service to compare the gathered measurements to reference measurements to determine that the gathered measurements and the reference measurements are the same, thereby establishing the trust in the gathered measurements. In accordance with this embodiment, the reference measurements are pre-computed prior to the DRTM sequence being executed. The reference measurements may be calculated prior to the attestation client code being received from the attestation service (e.g., by the operating system). For example, the attestation service may calculate the reference measurements based on knowledge that the attestation service will provide the attestation client code to the computing device. In accordance with this example, the attestation service may calculate the reference measurements based on knowledge that the computer programs stored on the computing device will include the attestation client code when the attestation client code gathers the measurements that indicate the attributes of the operating system. In an example implementation, the trust logic 622 causes the attestation service to establish trust in the measurements 644 by causing the protected measurements 638 to be provided to the attestation service.

In an example embodiment, the attestation service is caused to establish the trust in the gathered measurements at step 210 by providing the protected measurements to the attestation service. For instance, the trust logic 622 may provide the protected measurements 638 to the attestation service to cause the attestation service to establish the trust in the gathered measurements.

In another example embodiment, the attestation service is caused to establish the trust in the gathered measurements at step 210 by providing an instruction to the attestation client code. The instruction instructs the attestation client code to provide the protected measurements to the attestation service. For example, the trust logic 622 may provide the instruction to the attestation client code 614, instructing the attestation client code 614 to provide the protected measurements 638 to the attestation service. In accordance with this embodiment, the protected measurements are provided by the attestation client code to the attestation service based at least in part on (e.g., in response to or as a result of) receipt of the instruction from the operating system. For instance, the protection logic 628 may provide the protected measurements 638 to the attestation service based at least in part on (e.g., in response to or as a result of) receipt of the instruction from the trust logic 622.

In some example embodiments, one or more steps 202, 204, 206, 208, and/or 210 of flowchart 200 are not performed. Moreover, steps in addition to or in lieu of steps 202, 204, 206, 208, and/or 210 may be performed. For instance, in an example embodiment, the method of flowchart 200 further includes causing the attestation client code to obtain a report from a trustlet that executes in a secure environment on the operating system. The report indicates whether an attempt to modify a kernel of the operating system to run malicious code is detected. In an example implementation, the execution logic 620 causes the attestation client code 614 to obtain the report from the trustlet by providing an instruction to the attestation client code 614. In accordance with this implementation, the measurement logic 626 obtains the report from the trustlet, which executes in a secure environment on the operating system 610, based on receipt of the instruction from the execution logic 620. The trustlet indicates whether an attempt to modify a kernel of the operating system 610 to run malicious code is detected. In accordance with this embodiment, the method of flowchart 200 further includes causing the report to be provided to the attestation service. In an example implementation, the trust logic 622 causes the report to be provided to the attestation service. In an example embodiment, the trust logic 622 provides the report to the attestation service. In another embodiment, the trust logic 622 provides an instruction to the measurement logic 626 that instructs the measurement logic 626 to provide the report to the attestation service. In accordance with this embodiment, the measurement logic 626 provides the report to the attestation service based on receipt of the instruction from the trust logic 622.

In another example embodiment, the method of flowchart 200 further includes causing the attestation client code to gather real-time information about a runtime state of a software component, which executes on the operating system, over time. For instance, the real-time information may be gathered from a kernel of the operating system. In an example implementation, the execution logic 620 causes the attestation client code 614 to gather the real-time information about the runtime state of the software component by providing an instruction to the attestation client code 614. In accordance with this implementation, the measurement logic 626 gathers the real-time information about the runtime state of the software component, which executes on the operating system 610, based on receipt of the instruction from the execution logic 620. In accordance with this embodiment, the method of flowchart 200 further includes causing the real-time information about the runtime state of software component to be provided to the attestation service. In an example implementation, the trust logic 622 causes the real-time information to be provided to the attestation service. In an example embodiment, the trust logic 622 provides the real-time information to the attestation service. In another embodiment, the trust logic 622 provides an instruction to the measurement logic 626 that instructs the measurement logic 626 to provide the real-time information to the attestation service. In accordance with this embodiment, the measurement logic 626 provides the real-time information to the attestation service based on receipt of the instruction from the trust logic 622.

In an aspect of this embodiment, the information about the runtime state of the software component includes information about a resource that is accessed by the software component while the attestation client code executes. For example, the information may indicate that the software component is using an amount of memory, processor cycles, and/or network bandwidth that is greater than or equal to a threshold amount. In another example, the information may indicate that the software component has access to a network. In yet another example, the information may indicate that the software component has access to a secret. Examples of a secret include a cryptographic key, a policy, code, and data.

Figure 3:
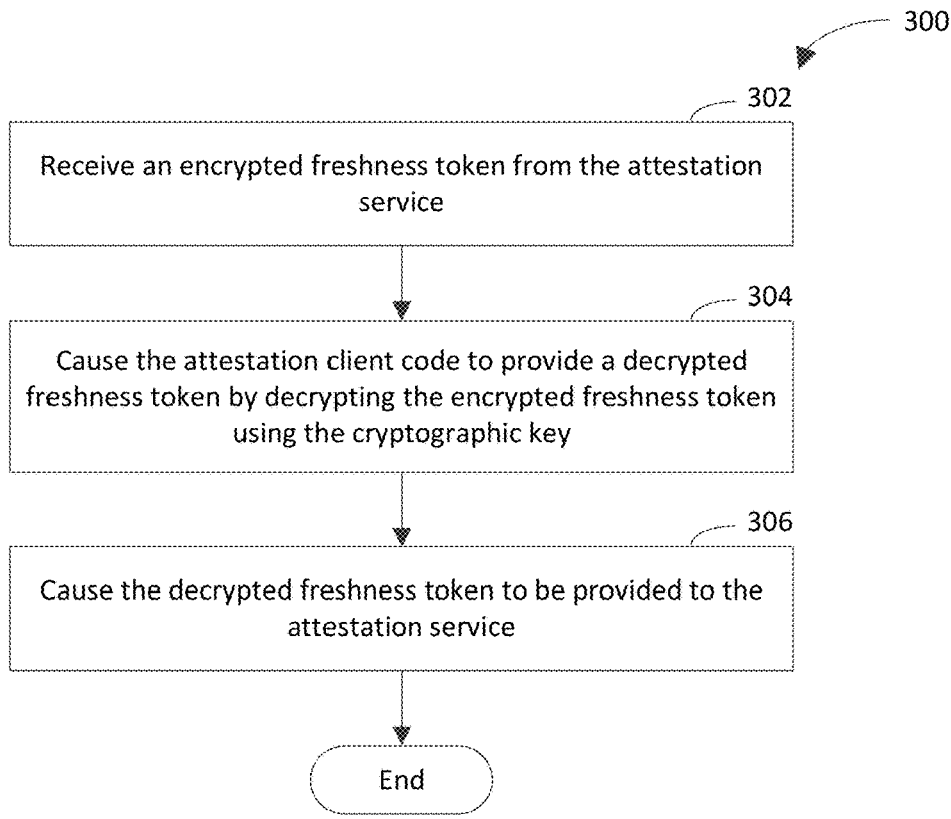

In yet another example embodiment, the method of flowchart 200 further includes one or more of the steps shown in flowchart 300 of FIG. 3. As shown in FIG. 3, the method of flowchart 300 begins at step 302. In step 302, an encrypted freshness token is received from the attestation service (e.g., by the operating system). In an example embodiment, the encrypted freshness token is configured to be decrypted using the cryptographic key, which is usable only by the attestation client code. In an example implementation, the execution logic 620 receives an encrypted freshness token 634 from the attestation service.

At step 304, the attestation client code is caused to provide a decrypted freshness token by decrypting the encrypted freshness token using the cryptographic key. In an example implementation, the execution logic 620 causes the attestation client code 614 to provide a decrypted freshness token 640 by providing an instruction to the attestation client code 614. In accordance with this implementation, the protection logic 628 decrypts the encrypted freshness token 634 to provide the decrypted freshness token 640 based on receipt of the instruction from the execution logic 620. For instance, the protection logic 628 may retrieve the encrypted freshness token 634 from the execution logic 620 for purposes of decryption.

At step 306, the decrypted freshness token is caused to be provided to the attestation service. In an example embodiment, causing the decrypted freshness token to be provided to the attestation service at step 306 enables the attestation service to establish trust in the protected measurements by causing the attestation service to compare the decrypted freshness token to a reference freshness token, which was encrypted by the attestation service to generate the encrypted freshness token. For instance, causing the decrypted freshness token to be provided to the attestation service may trigger the attestation service to perform the comparison. In accordance with this embodiment, the decrypted freshness token and the reference freshness token being the same satisfies a criterion for establishing the trust. In further accordance with this embodiment, the decrypted freshness token being different from the reference freshness token does not satisfy the criterion. In an example implementation, the trust logic 622 causes the decrypted freshness token 640 to be provided to the attestation service. In an example embodiment, the trust logic 622 provides the decrypted freshness token 640 to the attestation service. In another embodiment, the trust logic 622 provides an instruction to the protection logic 628 that instructs the protection logic 628 to provide the decrypted freshness token 640 to the attestation service. In accordance with this embodiment, the protection logic 628 provides the decrypted freshness token 640 to the attestation service based on receipt of the instruction from the trust logic 622.

It will be recognized that another computing device may intercept the protected measurements that are provided by the computing device. However, utilizing the encrypted freshness token as described above with reference to FIG. 3 may prevent malicious code that is running on the other computing device from using the protected measurements to obtain a verification, indicating that the other computing device is trustworthy, from the attestation service. For example, even if the other computing device forwards the protected measurements to the attestation service, the other computing device will have no way of providing the decrypted freshness token to the attestation service.

Figure 4:
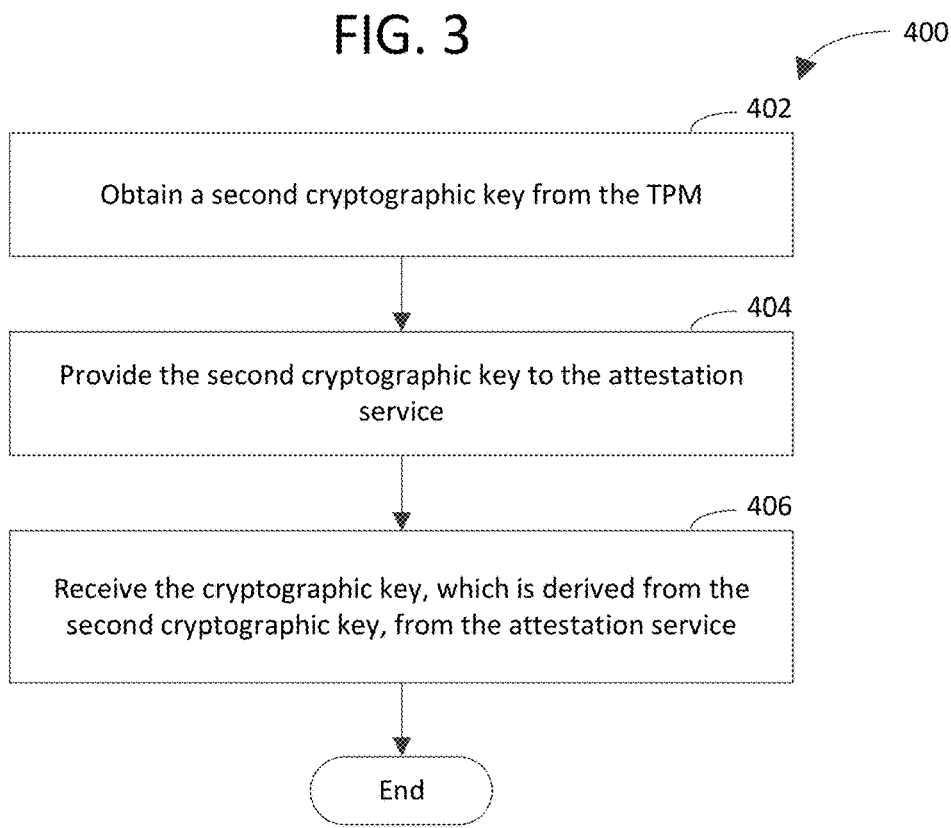

In still another example embodiment, the method of flowchart 200 includes one or more of the steps shown in flowchart 400 of FIG. 4. As shown in FIG. 4, the method of flowchart 400 begins at step 402. In step 402, a second cryptographic key is obtained from the TPM by the operating system. In an example implementation, the key logic 624 obtains a second cryptographic key 642 from the TPM 612. For instance, the key logic 624 may retrieve the second cryptographic key 642 from a kernel of the TPM 612.

At step 404, the second cryptographic key is provided to the attestation service (e.g., as a result of the second cryptographic key being obtained from the TPM). In an example implementation, the key logic 624 provides the second cryptographic key 642 to the attestation service.

At step 406, the cryptographic key, which is derived from the second cryptographic key, is received from the attestation service (e.g., as a result of the second cryptographic key being provided to the attestation service by the operating system). For instance, providing the second cryptographic key to the attestation service at step 404 may cause the attestation service to generate the first cryptographic key based on the second cryptographic key. In an example implementation, the first cryptographic key 632 is derived from the second cryptographic key 642. In accordance with this implementation, the execution logic 620 receives the first cryptographic key 632 from the attestation service (e.g., as a result of the key logic 624 providing the second cryptographic key 642 to the attestation service).

Figure 5:
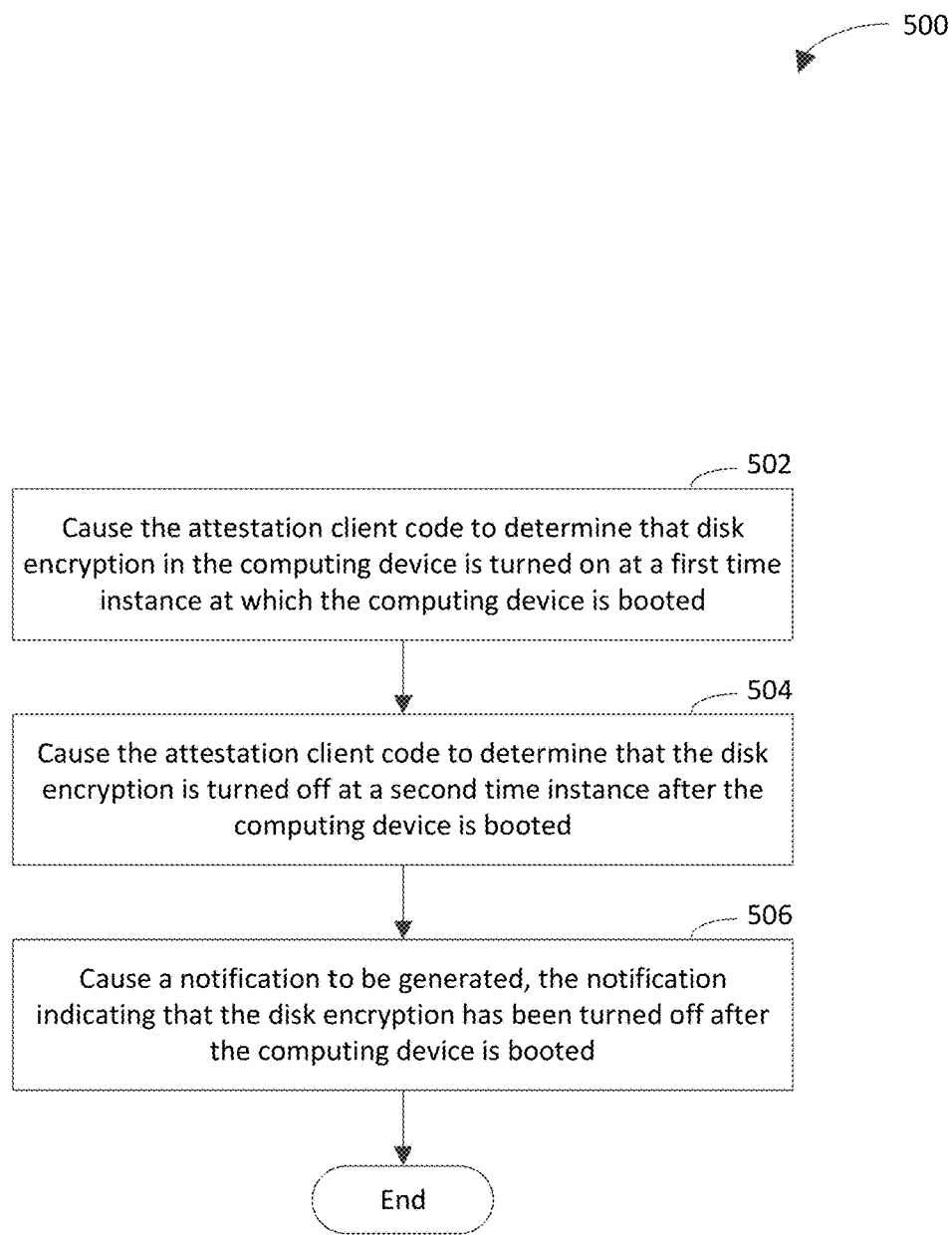
Figure 6:
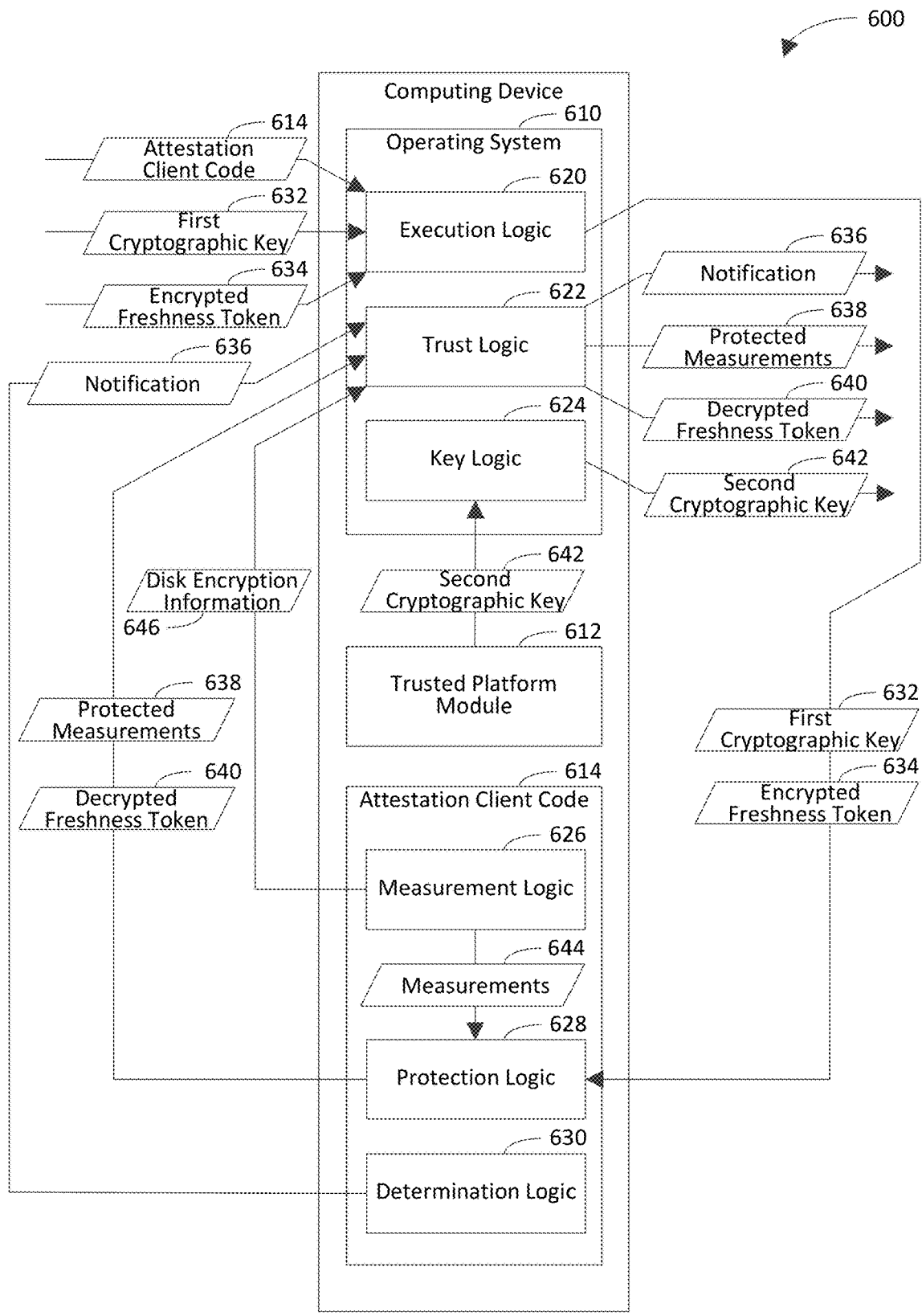
FIG. 6 is a block diagram of an example computing system in accordance with an embodiment.

In another example embodiment, the method of flowchart 200 further includes one or more of the steps shown in flowchart 500 of FIG. 5. As shown in FIG. 5, the method of flowchart 500 begins at step 502. In step 502, the attestation client code is caused to determine that disk encryption in the computing device is turned on at a first time instance at which the computing device is booted. In an example implementation, the execution logic 620 causes the attestation client code 614 to determine that disk encryption in the computing device 600 is turned on while the computing device 600 is being booted by providing a first instruction to the attestation client code 614. In accordance with this implementation, the measurement logic 626 determines that disk encryption in the computing device 600 is turned on while the computing device 600 is being booted based on receipt of the first instruction from the execution logic 620.

At step 504, the attestation client code is caused to determine that the disk encryption is turned off at a second time instance after the computing device is booted. In an example implementation, the execution logic 620 causes the attestation client code 614 to determine that the disk encryption is turned off after booting of the computing device 600 has been completed by providing a second instruction to the attestation client code 614. In accordance with this implementation, the measurement logic 626 determines that the disk encryption is turned off after booting of the computing device 600 has been completed based on receipt of the second instruction from the execution logic 620. The measurement logic 626 may generate disk encryption information 646 to indicate that the disk encryption in the computing device 600 is turned on while the computing device 600 is being booted and to further indicate that the disk encryption is turned off after booting of the computing device 600 has been completed.

At step 506, a notification is caused to be generated based at least in part on (e.g., in response to or as a result of) the disk encryption being turned off after the computing device is booted. The notification indicates that the disk encryption has been turned off after the computing device is booted. In an example implementation, the trust logic 622 causes a notification 636 to be generated based at least in part on (e.g., in response to or as a result of) the disk encryption being turned off after the computing device 600 is booted. For instance, the trust logic 622 may cause the notification 636 to be generated as a result of the disk encryption information 646 indicating that the disk encryption is turned off after the computing device 600 is booted.

It will be recognized that the computing device 600 may not include one or more of the operating system 610, the TPM 612, the attestation client code 614, the execution logic 620, the trust logic 622, the key logic 624, the measurement logic 626, the protection logic 628, and/or the determination logic 630. Furthermore, the computing device 600 may include components in addition to or in lieu of the operating system 610, the TPM 612, the attestation client code 614, the execution logic 620, the trust logic 622, the key logic 624, the measurement logic 626, the protection logic 628, and/or the determination logic 630.

Figure 7:
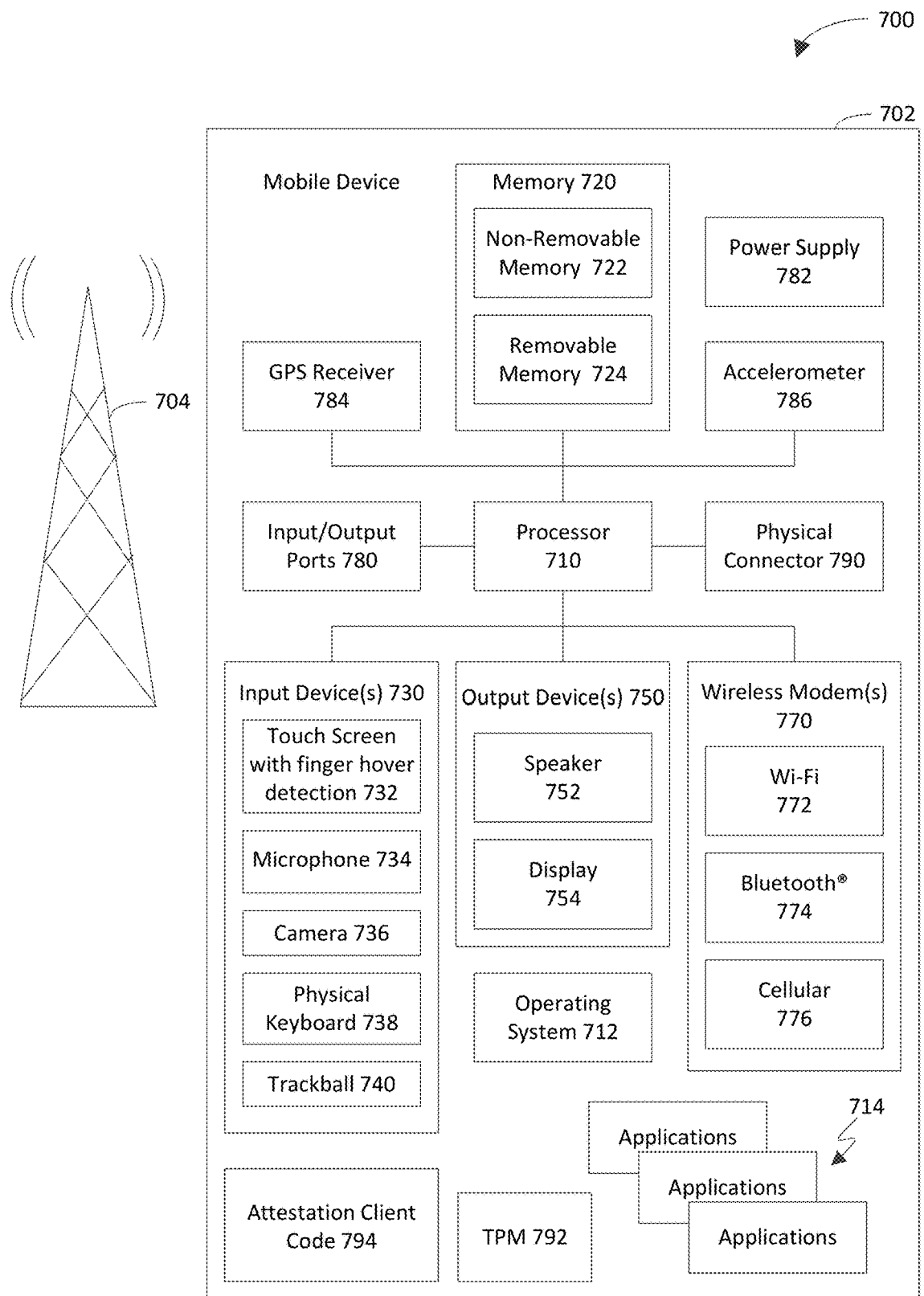
FIG. 7 is a system diagram of an example mobile device in accordance with an embodiment.

FIG. 7 is a system diagram of an example mobile device 700 including a variety of optional hardware and software components, shown generally as 702. Any components 702 in the mobile device may communicate with any other component, though not all connections are shown, for ease of illustration. The mobile device 700 may be any of a variety of computing devices (e.g., cell phone, smartphone, handheld computer, Personal Digital Assistant (PDA), etc.) and may allow wireless two-way communications with one or more mobile communications networks 704, such as a cellular or satellite network, or with a local area or wide area network.

The mobile device 700 includes a processor 710 (e.g., signal processor, microprocessor, ASIC, or other control and processing logic circuitry) for performing such tasks as signal coding, data processing, input/output processing, power control, and/or other functions. An operating system 712 may control the allocation and usage of the components 702 and support for one or more applications 714 (a.k.a. application programs). In an example embodiment, the operating system 712 is operable in a manner similar to the operating system 110 described above with reference to FIG. 1 and/or the operating system 610 described above with reference to FIG. 6. The applications 714 may include common mobile computing applications (e.g., email applications, calendars, contact managers, web browsers, messaging applications) and any other computing applications (e.g., word processing applications, mapping applications, media player applications).

The mobile device 700 includes a trusted platform module (TPM) 792, which is operable in a manner similar to the TPM 112 described above with reference to FIG. 1 and/or the TPM 612 described above with reference to FIG. 6. The mobile device 700 includes attestation client code 794, which is operable in the manner similar to the attestation client code 114 described above with reference to FIG. 1 and/or the attestation client code 614 described above with reference to FIG. 6.

The mobile device 700 includes memory 720. The memory 720 may include non-removable memory 722 and/or removable memory 724. The non-removable memory 722 may include random access memory (RAM), read-only memory (ROM), flash memory, a hard disk, or other well-known memory storage technologies. The removable memory 724 may include flash memory or a Subscriber Identity Module (SIM) card, which is well known in Global System for Mobile Communications (GSM) systems, or other well-known memory storage technologies, such as "smart cards." The memory 720 may store data and/or code for running the operating system 712, the applications 714, and attestation client code 794. Example data may include web pages, text, images, sound files, video data, or other data sets to be sent to and/or received from one or more network servers or other devices via one or more wired or wireless networks. Memory 720 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 700 may support one or more input devices 730, such as a touch screen 732, microphone 734, camera 736, physical keyboard 738 and/or trackball 740 and one or more output devices 750, such as a speaker 752 and a display 754. Touch screens, such as the touch screen 732, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 732 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 732 and display 754 may be combined in a single input/output device. The input devices 730 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 may include speech-recognition software as part of a voice control interface that allows a user to operate the mobile device 700 via voice commands. Furthermore, the mobile device 700 may include input devices and software that allows for user interaction via a user's spatial gestures, such as detecting and interpreting gestures to provide input to a gaming application.

Wireless modem(s) 770 may be coupled to antenna(s) (not shown) and may support two-way communications between the processor 710 and external devices, as is well understood in the art. The modem(s) 770 are shown generically and may include a cellular modem 776 for communicating with the mobile communication network 704 and/or other radio-based modems (e.g., Bluetooth® 774 and/or Wi-Fi 772). At least one of the wireless modem(s) 770 is typically configured for communication with one or more cellular networks, such as a GSM network for data and voice communications within a single cellular network, between cellular networks, or between the mobile device and a public switched telephone network (PSTN).

The mobile device may further include at least one input/output port 780, a power supply 782, a satellite navigation system receiver 784, such as a Global Positioning System (GPS) receiver, an accelerometer 786, and/or a physical connector 790, which may be a universal serial bus (USB) port, IEEE 1394 (FireWire) port, and/or RS-232 port. The illustrated components 702 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the operating system 110, the TPM 112, the attestation client code 114, the attestation service 116, the shared resources 118, the certification service 124, the operating system 610, the TPM 612, the attestation client code 614, the execution logic 620, the trust logic 622, the key logic 624, the measurement logic 626, the protection logic 628, the determination logic 630, flowchart 200, flowchart 300, flowchart 400, and/or flowchart 500 may be implemented in hardware, software, firmware, or any combination thereof.

For example, any one or more of the operating system 110, the TPM 112, the attestation client code 114, the attestation service 116, the shared resources 118, the certification service 124, the operating system 610, the TPM 612, the attestation client code 614, the execution logic 620, the trust logic 622, the key logic 624, the measurement logic 626, the protection logic 628, the determination logic 630, flowchart 200, flowchart 300, flowchart 400, and/or flowchart 500 may be implemented, at least in part, as computer program code configured to be executed in a processing system.

In another example, any one or more of the operating system 110, the TPM 112, the attestation client code 114, the attestation service 116, the shared resources 118, the certification service 124, the operating system 610, the TPM 612, the attestation client code 614, the execution logic 620, the trust logic 622, the key logic 624, the measurement logic 626, the protection logic 628, the determination logic 630, flowchart 200, flowchart 300, flowchart 400, and/or flowchart 500 may be implemented, at least in part, as hardware logic/electrical circuitry. Such hardware logic/electrical circuitry may include one or more hardware logic components. Examples of a hardware logic component include a field-programmable gate array (FPGA), an application-specific integrated circuit (ASIC), an application-specific standard product (ASSP), a system-on-a-chip system (SoC), and a complex programmable logic device (CPLD). For instance, a SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

Figure 8:
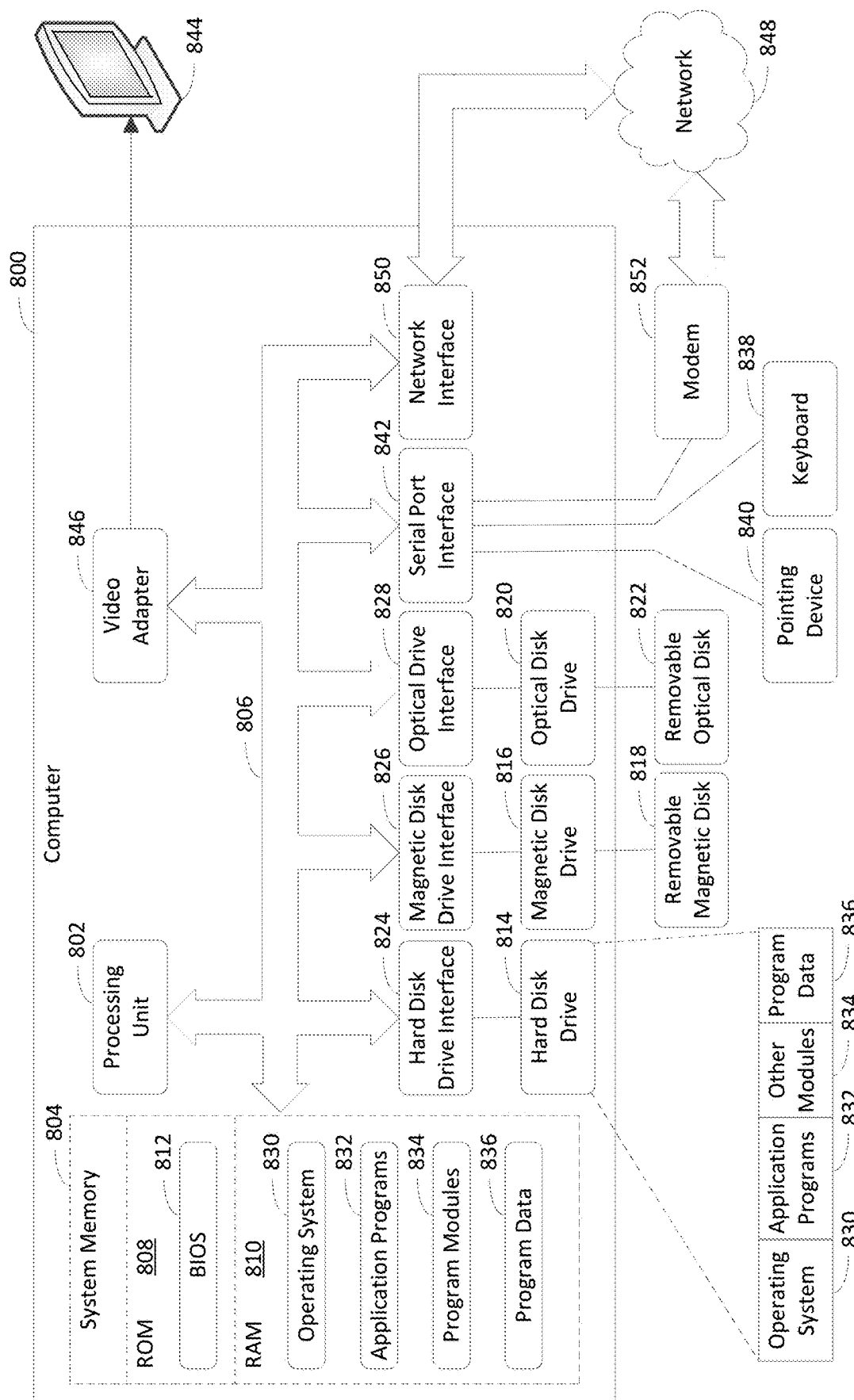
FIG. 8 depicts an example computer in which embodiments may be implemented.

II. Further Discussion of Some Example Embodiments (A1) An example computing device (FIG. 1, 102A-102M, 106A-106N; FIG. 6, 600; FIG. 7, 702; FIG. 8, 800) comprises a trusted platform module (TPM) (FIG. 1, 112; FIG. 6, 612; FIG. 7, 792), a memory (FIG. 7, 720, 722, 724; FIG. 8, 804, 808, 810) configured to store an operating system (FIG. 1, 110; FIG. 6, 610; FIG. 7, 712; FIG. 8, 830), and a processing system (FIG. 7, 710; FIG. 8, 802) coupled to the memory. The processing system is configured to execute the operating system. The operating system is configured to receive (FIG. 2, 202) attestation client code (FIG. 1, 114; FIG. 6, 614; FIG. 7, 794) and a cryptographic key (FIG. 1, 120, 126) from an attestation service (FIG. 1, 116). The cryptographic key is associated with the TPM and is usable only by the attestation client code. The operating system is further configured to execute (FIG. 2, 204) the attestation client code by executing a dynamic root of trust for measurement (DRTM) sequence. The attestation client code is configured to gather measurements (FIG. 6, 644) that indicate attributes of the operating system. The attestation client code is further configured to generate protected measurements (FIG. 6, 638) by using the cryptographic key to sign or encrypt the measurements. The operating system is further configured to cause (FIG. 2, 210) the attestation service to establish trust in the measurements by causing the protected measurements to be provided to the attestation service.

(A2) In the example computing device of A1, wherein the cryptographic key is usable only while the attestation client code is being executed by the computing device.

(A3) In the example computing device of any of A1-A2, wherein the DRTM sequence is configured to restrict execution of code on the operating system such that no code other than the attestation client code executes on the operating system while the attestation client code executes.

(A4) In the example computing device of any of A1-A3, wherein the operating system is configured to provide the protected measurements to the attestation service.

(A5) In the example computing device of any of A1-A4, wherein the operating system is configured to provide an instruction to the attestation client code to provide the protected measurements to the attestation service; and wherein the attestation client code is configured to provide the protected measurements to the attestation service based at least in part on receipt of the instruction from the operating system.

(A6) In the example computing device of any of A1-A5, wherein the operating system is configured to: obtain a second cryptographic key from the TPM; and provide the second cryptographic key to the attestation service; and wherein the cryptographic key is derived from the second cryptographic key.

(A7) In the example computing device of any of A1-A6, wherein the operating system is further configured to: receive an encrypted freshness token from the attestation service; wherein the attestation client code is configured to: provide a decrypted freshness token by decrypting the encrypted freshness token using the cryptographic key; and wherein the trust in the measurements is further established by causing the decrypted freshness token to be provided to the attestation service.

(A8) In the example computing device of any of A1-A7, wherein the attestation client code is further configured to obtain a report from a trustlet that executes in a secure environment on the operating system, the report indicating whether an attempt to modify a kernel of the operating system to run malicious code is detected; and wherein the operating system is further configured to cause the report to be provided to the attestation service.

(A9) In the example computing device of any of A1-A8, wherein the attestation client code is configured to gather real-time information about a runtime state of a software component, which executes on the operating system, over time; and wherein the operating system is further configured to cause the real-time information about the runtime state of software component to be provided to the attestation service.

(A10) In the example computing device of any of A1-A9, wherein the information about the runtime state of the software component includes information about a resource that is accessed by the software component while the attestation client code executes.

(A11) In the example computing device of any of A1-A10, wherein the attestation client code is configured to: determine that disk encryption is turned on at a first time instance at which the computing device is booted; and determine that the disk encryption is turned off at a second time instance after the computing device is booted; and wherein the operating system is configured to cause a notification to be generated based at least in part on the disk encryption being turned off after the computing device is booted, the notification indicating that the disk encryption has been turned off after the computing device is booted.

(B1) A first example method of using attestation client code (FIG. 1, 114; FIG. 6, 614; FIG. 7, 794) to attest health of a computing device (FIG. 1, 102A-102M, 106A-106N; FIG. 6, 600; FIG. 7, 702; FIG. 8, 800). The method is implemented by the computing device. The method comprises receiving (FIG. 2, 202) the attestation client code and a cryptographic key (FIG. 1, 120, 126) from an attestation service (FIG. 1, 116). The cryptographic key is associated with a trusted platform module (TPM) (FIG. 1, 112; FIG. 6, 612; FIG. 7, 792) of the computing device and is usable only by the attestation client code. The method further comprises executing (FIG. 2, 204) the attestation client code by executing a dynamic root of trust for measurement (DRTM) sequence. The method further comprises causing (FIG. 2, 206) the attestation client code to gather measurements (FIG. 6, 644) that indicate attributes of an operating system (FIG. 1, 110; FIG. 6, 610; FIG. 7, 712; FIG. 8, 830) that executes on the computing device. The method further comprises causing (FIG. 2, 208) the attestation client code to generate protected measurements (FIG. 6, 638) by using the cryptographic key to sign or encrypt the measurements. The method further comprises causing (FIG. 2, 210) the attestation service to establish trust in the measurements by causing the protected measurements to be provided to the attestation service.

(B2) In the example method of B1, wherein executing the DRTM sequence comprises: using the DRTM sequence to restrict execution of code on the operating system such that no code other than the attestation client code executes on the operating system while the attestation client code executes.

(B3) In the example method of any of B1-B2, further comprising: obtaining a second cryptographic key from the TPM; and providing the second cryptographic key to the attestation service; wherein the cryptographic key is derived from the second cryptographic key.

(B4) In the example method of any of B1-B3, further comprising: receiving an encrypted freshness token from the attestation service; and causing the attestation client code to provide a decrypted freshness token by decrypting the encrypted freshness token using the cryptographic key; wherein causing the attestation service to establish the trust in the measurements comprises: causing the decrypted freshness token to be provided to the attestation service.

(B5) In the example method of any of B1-B4, further comprising: causing the attestation client code to obtain a report from a trustlet that executes in a secure environment on the operating system, the report indicating whether an attempt to modify a kernel of the operating system to run malicious code is detected; and causing the report to be provided to the attestation service.

(B6) In the example method of any of B1-B5, further comprising: causing the attestation client code to gather real-time information about a runtime state of a software component, which executes on the operating system, over time; and causing the real-time information about the runtime state of software component to be provided to the attestation service.

(B7) In the example method of any of B1-B6, wherein the information about the runtime state of the software component includes information about a resource that is accessed by the software component while the attestation client code executes.

(B8) In the example method of any of B1-B7, further comprising: causing the attestation client code to determine that disk encryption in the computing device is turned on at a first time instance at which the computing device is booted; causing the attestation client code to determine that the disk encryption is turned off at a second time instance after the computing device is booted; and causing a notification to be generated based at least in part on the disk encryption being turned off after the computing device is booted, the notification indicating that the disk encryption has been turned off after the computing device is booted.

(C1) A second example method of using attestation client code (FIG. 1, 114; FIG. 6, 614; FIG. 7, 794) to attest health of a computing device (FIG. 1, 102A-102M, 106A-106N; FIG. 6, 600; FIG. 7, 702; FIG. 8, 800). The method is implemented by the computing device. The method comprises receiving (FIG. 2, 202) the attestation client code and a cryptographic key (FIG. 1, 120, 126) from an attestation service (FIG. 1, 116). The cryptographic key is bound to a trusted platform module (TPM) (FIG. 1, 112; FIG. 6, 612; FIG. 7, 792) of the computing device and is usable only while the attestation client code is executing. The method further comprises executing (FIG. 2, 204) a dynamic root of trust for measurement (DRTM) sequence, which initiates execution of the attestation client code. Executing the DRTM sequence comprises: causing (FIG. 2, 206) the attestation client code to gather measurements (FIG. 6, 644) that indicate attributes of an operating system (FIG. 1, 110; FIG. 6, 610; FIG. 7, 712; FIG. 8, 830) of the computing device; and causing (FIG. 2, 208) the attestation client code to generate protected measurements (FIG. 6, 638) by using the cryptographic key to sign or encrypt the measurements. The method further comprises causing (FIG. 2, 210) the attestation service to establish trust in the measurements by causing the protected measurements to be provided to the attestation service.

(D1) An example computer program product (FIG. 7, 724; FIG. 8, 818, 822) comprising a computer-readable storage medium having instructions recorded thereon for enabling a processor-based system (FIG. 1, 102A-102M, 106A-106N;

FIG. 6, 600; FIG. 7, 702; FIG. 8, 800) to use attestation client code to attest health of the processor-based system by performing operations. The operations comprise receiving (FIG. 2, 202) the attestation client code and a cryptographic key (FIG. 1, 120, 126) from an attestation service (FIG. 1, 116). The cryptographic key is associated with a trusted platform module (TPM) (FIG. 1, 112; FIG. 6, 612; FIG. 7, 792) of the processor-based system and is usable only by the attestation client code. The operations further comprise executing (FIG. 2, 204) the attestation client code by executing a dynamic root of trust for measurement (DRTM) sequence. The operations further comprise causing (FIG. 2, 206) the attestation client code to gather measurements (FIG. 6, 644) that indicate attributes of an operating system (FIG. 1, 110; FIG. 6, 610; FIG. 7, 712; FIG. 8, 830) that executes on the processor-based system. The operations further comprise causing (FIG. 2, 208) the attestation client code to generate protected measurements (FIG. 6, 638) by using the cryptographic key to sign or encrypt the measurements. The operations further comprise causing (FIG. 2, 210) the attestation service to establish trust in the measurements by causing the protected measurements to be provided to the attestation service.

III. Example Computer System

FIG. 8 depicts an example computer 800 in which embodiments may be implemented. Any one or more of the computing devices 102A-102M, the attestation system 104, any one or more of the servers 106A-106N, and/or the certification system 122 shown in FIG. 1; the computing system 600 shown in FIG. 6; and/or the computing system 700 shown in FIG. 7 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system (BIOS) 812 is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) the operating system 110, the TPM 112, the attestation client code 114, the attestation service 116, the shared resources 118, the certification service 124, the operating system 610, the TPM 612, the attestation client code 614, the execution logic 620, the trust logic 622, the key logic 624, the measurement logic 626, the protection logic 628, the determination logic 630, flowchart 200 (including any step of flowchart 200), flowchart 300 (including any step of flowchart 300), flowchart 400 (including any step of flowchart 400), and/or flowchart 500 (including any step of flowchart 500), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. CONCLUSION

The foregoing detailed description refers to the accompanying drawings that illustrate example embodiments of the present disclosure. However, the scope of the present disclosure is not limited to these embodiments, but is instead defined by the appended claims. Thus, embodiments beyond those shown in the accompanying drawings, such as modified versions of the illustrated embodiments, may nevertheless be encompassed by the present disclosure.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", and "third" are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A computing device comprising:
a trusted platform module (TPM);
a memory configured to store an operating system; and
a processing system coupled to the memory, the processing system configured to execute the operating system, the operating system configured to:
receive, from an attestation service that is external to the computing device, attestation client code and a cryptographic key, the cryptographic key is associated with the TPM and is usable only by the attestation client code;
execute the attestation client code by executing a dynamic root of trust for measurement (DRTM) sequence, wherein the attestation client code is configured to:
gather measurements that indicate attributes of the operating system; and
generate protected measurements by using the cryptographic key to sign or encrypt the measurements; and
cause the attestation service to establish trust in the measurements by causing the protected measurements to be provided to the attestation service.

2. The computing device of claim 1, wherein the cryptographic key is usable only while the attestation client code is being executed by the computing device.

3. The computing device of claim 1, wherein the DRTM sequence is configured to restrict execution of code on the operating system, wherein no code other than the attestation client code executes on the operating system while the attestation client code executes.

4. The computing device of claim 1, wherein the operating system is configured to provide the protected measurements to the attestation service.

5. The computing device of claim 1, wherein the operating system is configured to provide an instruction to the attestation client code to provide the protected measurements to the attestation service; and
wherein the attestation client code is configured to provide the protected measurements to the attestation service based at least in part on receipt of the instruction from the operating system.

6. The computing device of claim 1, wherein the operating system is configured to:
obtain a second cryptographic key from the TPM; and
provide the second cryptographic key to the attestation service; and
wherein the cryptographic key is derived from the second cryptographic key.

7. The computing device of claim 1, wherein the operating system is further configured to:
receive an encrypted token from the attestation service;
wherein the attestation client code is configured to:
provide a decrypted token by decrypting the encrypted token using the cryptographic key; and
wherein the trust in the measurements is further established by causing the decrypted token to be provided to the attestation service.

8. The computing device of claim 1, wherein the attestation client code is further configured to obtain a report from a trustlet that executes in a secure environment on the operating system, the report indicating whether an attempt to modify a kernel of the operating system to run malicious code is detected; and wherein the operating system is further configured to cause the report to be provided to the attestation service.

9. The computing device of claim 1, wherein the attestation client code is configured to gather real-time information about a runtime state of a software component, which executes on the operating system, over time; and
wherein the operating system is further configured to cause the real-time information about the runtime state of software component to be provided to the attestation service.

10. The computing device of claim 9, wherein the information about the runtime state of the software component includes information about a resource that is accessed by the software component while the attestation client code executes.

11. The computing device of claim 1, wherein the attestation client code is configured to:
determine that disk encryption is turned on at a first time instance at which the computing device is booted; and
determine that the disk encryption is turned off at a second time instance after the computing device is booted; and
wherein the operating system is configured to cause a notification to be generated based at least in part on the disk encryption being turned off after the computing device is booted, the notification indicating that the disk encryption has been turned off after the computing device is booted.

12. A method of using attestation client code to attest health of a computing device, the method implemented by the computing device, the method comprising:
receiving, from an attestation service that is external to the computing device, the attestation client code and a cryptographic key, the cryptographic key is associated with a trusted platform module (TPM) of the computing device and is usable only by the attestation client code;
executing the attestation client code by executing a dynamic root of trust for measurement (DRTM) sequence;
causing the attestation client code to gather measurements that indicate attributes of an operating system that executes on the computing device;
causing the attestation client code to generate protected measurements by using the cryptographic key to sign or encrypt the measurements; and
causing the attestation service to establish trust in the measurements by causing the protected measurements to be provided to the attestation service.

13. The method of claim 12, wherein executing the DRTM sequence comprises:
using the DRTM sequence to restrict execution of code on the operating system, wherein no code other than the attestation client code executes on the operating system while the attestation client code executes.

14. The method of claim 12, further comprising:
obtaining a second cryptographic key from the TPM; and
providing the second cryptographic key to the attestation service;
wherein the cryptographic key is derived from the second cryptographic key.

15. The method of claim 12, further comprising:
receiving an encrypted token from the attestation service; and
causing the attestation client code to provide a decrypted token by decrypting the encrypted token using the cryptographic key;
wherein causing the attestation service to establish the trust in the measurements comprises:
causing the decrypted token to be provided to the attestation service.

16. The method of claim 12, further comprising:
causing the attestation client code to obtain a report from a trustlet that executes in a secure environment on the operating system, the report indicating whether an attempt to modify a kernel of the operating system to run malicious code is detected; and
causing the report to be provided to the attestation service.

17. The method of claim 12, further comprising:
causing the attestation client code to gather real-time information about a runtime state of a software component, which executes on the operating system, over time; and
causing the real-time information about the runtime state of software component to be provided to the attestation service.

18. The method of claim 17, wherein the information about the runtime state of the software component includes information about a resource that is accessed by the software component while the attestation client code executes.

19. The method of claim 12, further comprising:
causing the attestation client code to determine that disk encryption in the computing device is turned on at a first time instance at which the computing device is booted;
causing the attestation client code to determine that the disk encryption is turned off at a second time instance after the computing device is booted; and
causing a notification to be generated based at least in part on the disk encryption being turned off after the computing device is booted, the notification indicating that the disk encryption has been turned off after the computing device is booted.

20. A method of using attestation client code to attest health of a computing device, the method implemented by the computing device, the method comprising:
receiving, from an attestation service that is external to the computing device, the attestation client code and a cryptographic key, the cryptographic key is bound to a trusted platform module (TPM) of the computing device and is usable only while the attestation client code is executing;
executing a dynamic root of trust for measurement (DRTM) sequence, which initiates execution of the attestation client code, wherein executing the DRTM sequence comprises:
causing the attestation client code to gather measurements that indicate attributes of an operating system of the computing device; and
causing the attestation client code to generate protected measurements by using the cryptographic key to sign or encrypt the measurements; and
causing the attestation service to establish trust in the measurements by causing the protected measurements to be provided to the attestation service.

* * * * *